US011241675B2

(12) United States Patent
Xu et al.

(10) Patent No.: US 11,241,675 B2
(45) Date of Patent: Feb. 8, 2022

(54) AFI-CHA HYBRID CRYSTAL ZEOLITE AND NH3-SCR CATALYST USING SAME AS CARRIER, AND PREPARATION METHODS THEREOF

(71) Applicant: SICHUAN UNIVERSITY, Chengdu (CN)

(72) Inventors: Haidi Xu, Chengdu (CN); Qingjin Lin, Chengdu (CN); Yaoqiang Chen, Chengdu (CN); Yun Wang, Chengdu (CN); Xi Feng, Chengdu (CN); Jianli Wang, Chengdu (CN); Ming Zhao, Chengdu (CN); Yi Jiao, Chengdu (CN)

(73) Assignee: SICHUAN UNIVERSITY, Chengdu (CN)

( * ) Notice: Subject to any disclaimer, the term of this patent is extended or adjusted under 35 U.S.C. 154(b) by 0 days.

(21) Appl. No.: 17/283,969

(22) PCT Filed: May 10, 2020

(86) PCT No.: PCT/CN2020/089513
§ 371 (c)(1),
(2) Date: Apr. 9, 2021

(87) PCT Pub. No.: WO2020/228652
PCT Pub. Date: Nov. 19, 2020

(65) Prior Publication Data
US 2021/0308655 A1   Oct. 7, 2021

(30) Foreign Application Priority Data

May 10, 2019   (CN) .......................... 201910391492.4

(51) Int. Cl.
*B01J 29/06*   (2006.01)
*B01J 23/72*   (2006.01)
*B01J 6/00*   (2006.01)
*B01J 29/70*   (2006.01)
*B01J 29/72*   (2006.01)
*B01J 29/76*   (2006.01)
*B01J 29/85*   (2006.01)
*B01J 37/04*   (2006.01)
*B01J 37/08*   (2006.01)
*B01J 29/84*   (2006.01)
*B01J 29/83*   (2006.01)
*B01J 35/04*   (2006.01)
*B01J 37/10*   (2006.01)
*B01J 37/02*   (2006.01)
*B01J 29/00*   (2006.01)
*B01D 53/94*   (2006.01)
*B01D 53/56*   (2006.01)
*C01B 39/54*   (2006.01)

(52) U.S. Cl.
CPC .......... *B01J 23/72* (2013.01); *B01D 53/9418* (2013.01); *B01J 6/001* (2013.01); *B01J 29/005* (2013.01); *B01J 29/7015* (2013.01); *B01J 29/723* (2013.01); *B01J 29/763* (2013.01); *B01J 29/83* (2013.01); *B01J 29/84* (2013.01); *B01J 29/85* (2013.01); *B01J 35/04* (2013.01); *B01J 37/0201* (2013.01); *B01J 37/04* (2013.01); *B01J 37/08* (2013.01); *B01J 37/10* (2013.01); *B01D 53/56* (2013.01); *B01D 53/94* (2013.01); *B01J 2229/183* (2013.01); *B01J 2229/186* (2013.01); *C01B 39/54* (2013.01)

(58) Field of Classification Search
CPC ... B01J 6/001; B01J 23/72; B01J 29/83; B01J 29/84; B01J 29/85; B01J 29/7015; B01J 29/723; B01J 29/763; B01J 29/005; B01J 2229/183; B01J 2229/186; B01J 35/04; B01J 37/30; B01J 37/0215; B01J 37/0246; B01J 37/04; B01J 37/08; B01J 37/10; B01J 37/0201; C01B 39/454; C01B 39/54; B01D 53/9418; B01D 53/94; B01D 53/56
USPC .......... 502/60, 64, 67, 69, 74; 423/704, 705
See application file for complete search history.

(56) References Cited

U.S. PATENT DOCUMENTS

2006/0079723 A1 *  4/2006  Mertens ................. B01J 29/005
                                                                  585/639
2015/0352538 A1 * 12/2015  Schoenfeldt ............. B01J 29/06
                                                                  502/64

FOREIGN PATENT DOCUMENTS

CN   101983103 A    3/2011
CN   104828842 A    8/2015
(Continued)

OTHER PUBLICATIONS

Machine translation CN 107744830, Mar. 18, 2018.*
Machine translation CN 104828842, Aug. 12, 2015.*

*Primary Examiner* — Elizabeth D Wood
(74) *Attorney, Agent, or Firm* — Bayramoglu Law Offices LLC

(57) ABSTRACT

An AFI-CHA hybrid crystal molecular sieve and an $NH_3$-SCR catalyst using the AFI-CHA hybrid crystal molecular sieve as a carrier, and preparation methods thereof are disclosed. The AFI-CHA hybrid crystal molecular sieve includes an AFI-type SAPO-5 molecular sieve and a CHA-type SAPO-34 molecular sieve, with hybrid crystal grains of AFI and CHA. The hybrid crystal molecular sieve is synthesized by a hydrothermal synthesis method and can be obtained by changing the structure directing agent, the heating rate and the calcinating temperature in the preparation process. Further, copper is loaded on the basis of the hybrid crystal molecular sieve to prepare copper-based $NH_3$-SCR catalyst and corresponding monolithic catalyst. The catalytic activity and hydrothermal stability of the catalyst are significantly improved by the hybrid crystal molecular sieve.

7 Claims, 5 Drawing Sheets

(56) References Cited

FOREIGN PATENT DOCUMENTS

| | | |
|---|---|---|
| CN | 106607087 A | 5/2017 |
| CN | 107744830 A | 3/2018 |
| CN | 110227540 A | 9/2019 |
| WO | 2011061835 A1 | 5/2011 |

* cited by examiner

AFI-CHA HYBRID CRYSTAL ZEOLITE AND NH3-SCR CATALYST USING SAME AS CARRIER, AND PREPARATION METHODS THEREOF

CROSS REFERENCE TO THE RELATED APPLICATIONS

This application is the national phase entry of International Application No. PCT/CN2020/089513, filed on May 10, 2020, which is based upon and claims priority to Chinese Patent Application No. 201910391492.4, filed on May 10, 2019, the entire contents of which are incorporated herein by reference.

TECHNICAL FIELD

The present invention belongs to the technical field of $NH_3$-SCR, and particularly relates to an $NH_3$-SCR catalyst.

BACKGROUND

Nitrogen oxides ($NO_x$) emitted from diesel vehicles is one of the important air pollutants, $NO_x$ causes acid rain, haze, and photochemical smog, furthermore, it also leas to the cancer and other diseases, thus posing a serious threat to human health. Selective catalytic reduction (SCR) technology was first proposed by Engelhard Corporation, and then was first applied for the denitration of stationary sources by the Kudamatsu power plant in Japan. SCR needs the reducing agent to eliminate $NO_x$ from exhaust gas into nontoxic $N_2$ and $H_2O$. The reducing agents can be hydrocarbons (HCs), hydrogen ($H_2$) and ammonia ($NH_3$). Because HCs are directly derived from fuel oil, selective catalytic reduction with HCs (HCs-SCR) technology does not require the additional equipment for providing reducing agents. exhibiting certain advantages on the cost. However, its $NO_x$ conversion and temperature window do not satisfy the emission legislation well, and the serious sulfur poison and carbon deposition problem need also be solved, which directly limits its application in diesel vehicles. At the low temperature, the maximum $NO_x$ conversion of selective catalytic reduction with $H_2$ ($H_2$-SCR) appears at about 150° C., which is better than that of HC-SCR. Furthermore, $H_2$-SCR has no problem of the deposited carbon and the poison of sulfate at the low temperature. However, this technology has the disadvantage on too much $H_2$ consumption ($H_2/NO=2$) and a terrible selectivity.

Compared with above technologies, selective catalytic reduction with $NH_3$ ($NH_3$-SCR) technology have more obvious advantages on $NO_x$ conversion, temperature window and $N_2$ selectivity. $NH_3$-SCR technology was first used for the denitration from the stationary source, and then was used for the denitration from mobile source. After many improvements and developments, this technology has become a one of the most effective technologies, widely used in the after-treatment system of diesel vehicles. As the core part of $NH_3$-SCR technology, the development of high-effective catalysts is crucial. $V_2O_5/WO_x$—$TiO_2$ catalysts in China have some disadvantages of the poor low-temperature activity, the high volatility of vanadium oxide at the high temperature and the low $N_2$ selectivity, which limits its further development. In addition, the temperature of the diesel particulate filter (DPF) is instantly increased to 600° C. in periodic regeneration, and may even reaches 800° C., which usually deteriorates the performance of $NH_3$-SCR catalysts located downstream of DPF. Moreover, there is always about 10 vol. % of water vapor in the exhaust of diesel vehicles, so $NH_3$-SCR catalysts require the high-temperature hydrothermal stability. Thus, the poor high-temperature stability of $V_2O_5/WO_x$—$TiO_2$ catalysts further impedes its application in diesel vehicles.

Since ZSM-5 zeolite was used in $NH_3$-SCR in 1991, zeolite has gradually become one of the important materials of $NH_3$-SCR catalysts due to its environment-friendly, large specific surface area and regular pores structure, which is conducive to the dispersion of metal species into pores, as well as the diffusion of gas molecules. Zeolites used in $NH_3$-SCR systems mainly include mordenite (MFI, mainly ZSM-5), BEA-structure type (mainly beta) and chabazite (CHA, mainly SAPO-34 and SSZ-13). Among zeolite-based catalysts, Cu-CHA (SSZ-13 and SAPO-34) catalysts have the relatively excellent activity among a wide temperature window, and eliminates $NO_x$ completely at the lower temperature, importantly, this type catalyst owns the considerable hydrothermal stability, having become a hotspot in recent years.

The high-temperature hydrothermal stability of Cu/SSZ-13 is inferior to that of Cu/SAPO-34, furthermore, expensive template further limits its commercial application. Although Cu/SAPO-34 has become one of the most effective $NH_3$-SCR catalysts, its high-temperature hydrothermal stability still needs to be further improved due to the requirements of more and more harsh emission standards for diesel vehicle.

SUMMARY

The objective of the present invention is to provide an AFI-CHA hybrid crystal zeolite and a preparation method thereof in view of the deficiencies of the prior art, so as to further improve the catalytic performance and high-temperature hydrothermal stability of Cu-zeolite $NH_3$-SCR catalysts.

SAPO-34 is a small-pore zeolite with CHA structure, and its framework contains an eight-membered ring-shaped ellipsoidal cage and a hexagonal structure. SAPO-n series zeolites are sensitive to synthesis conditions. The gel composition, crystallization temperature and crystallization time might influence the distribution of Si into the zeolite. During the synthesis of SAPO-34, SAPO-5 might be generated due to the changed synthesis conditions. SAPO-5 zeolite is SAPO-n series zeolite with an AFI structure, which contains one-dimensional channels bounded by twelve-membered rings composed of two six-membered rings and two four-membered rings, showing good catalytic performance in isomerization, catalytic cracking, carbonylation and hydroxylation reactions. However, SAPO-5 has rarely been reported in the $NH_3$-SCR reaction. After Si replaces the framework atoms of aluminophosphate (AlPO)-5, SAPO-5 framework provides some negative charges, exhibiting the ion-exchange ability. Moreover, AFI zeolite has the stable structure. According to the synthesis characteristics of SAPO-n zeolites, hybrid crystals of AFI and CHA are obtained by changing the crystallization conditions, thereby improving the high-temperature hydrothermal stability of SAPO-34 zeolites.

The present invention provides an AFI-CHA hybrid crystal zeolite, including an AFI-type SAPO-5 zeolite and a CHA-type SAPO-34 zeolite, with hybrid crystal grains of AFI and CHA.

The codes of the novel AFI-CHA framework type are AFI and CHA zeolites proposed by the International Zeolite Association (IZA).

The present invention provides a Cu/AFI-CHA supported zeolite catalyst based on the above AFI-CHA hybrid crystal zeolite, wherein Cu is supported on the AFI-CHA hybrid crystal zeolite.

The present invention provides a monolithic catalyst, including a substrate and a Cu/AFI-CHA supported catalyst powder, wherein the Cu/AFI-CHA supported catalyst powder is washcoated on a cordierite monolith substrate.

The present invention provides a method for preparing the above-mentioned AFI-CHA hybrid crystal zeolite, wherein the AFI-CHA hybrid crystal zeolite is synthesized by a hydrothermal method; during the synthesis process, a molar ratio of aluminum:phosphorus:silicon:a structure directing agent (a templating agent):water in the zeolite is (0.06-0.10): (0.06-0.10):(0.040-0.050):(0.12-0.35):(0.5-6); that is, during the synthesis process, a mixed solution is fed according to a molar ratio of $Al_2O_3:P_2O_5:SiO_2$:the structure directing agent:$H_2O$ in the range of (0.06-0.10):(0.06-0.10): (0.040-0.050):(0.01-0.40):(0.5-6).

Further, the method includes the following steps:

(1) mixing pseudoboehmite, phosphoric acid and a part of a total water consumption uniformly, stirring and aging at room temperature to prepare a P/Al oxide gel, and then adding a Si source, the structure directing agent and the remaining water to the gel, followed by aging at room temperature to obtain a mixed solution; and (2) keeping the mixed solution at 120° C.-160° C. for 2-20 h, then heating to 190° C.-210° C. and holding for 5-30 h, cooling to room temperature and separating a solid, then removing the structure directing agent at 500° C.-600° C. for 5-8 h to obtain AFI-CHA hybrid crystal zeolite powders.

Further, the pseudoboehmite is 8-15 parts by weight, the phosphoric acid is 13-23 parts by weight, the Si source is 5-8 parts by weight, and the structure directing agent is 1-41 parts by weight.

Further, in step (1), when preparing the P/Al oxide gel, the stirring is carried out for 1 to 24 h, and the aging is carried out for 1 to 24 h at the room temperature.

Further, the heating rate in step (2) is 3-6° C.·$min^{-1}$.

Further, the structure directing agent is triethylamine (TEA) and tetraethyl ammonium hydroxide (TEAOH).

During the preparation process, a series of zeolite powders are synthesized by changing the content of the structure directing agent and the heating rate in the hydrothermal synthesis as follows.

Feeding is carried out according to a molar ratio of aluminum:phosphorus:silicon:a structure directing agent (a templating agent):water in the range of (0.06-0.10):(0.06-0.10):(0.040-0.050):(0.01-0.40):(0.5-6). Three type powders of SAPO-34, SAPO-5 and AFI-CHA zeolite are prepared by changing the content of the structure directing agent. When preparing SAPO-34, a proportion of the structure directing agent is 0.35-0.40; when preparing SAPO-5, a proportion of the structure directing agent is 0.01-0.12; and when preparing AFI-CHA zeolite powder, a proportion of the structure directing agent is 0.12-0.35. Different types of zeolite powders are also synthesized by regulating the heating rate in the hydrothermal synthesis. AFI-CHA hybrid crystal zeolite powders are easily produced at a relatively fast heating rate (3-6° C.·$min^{-1}$), while the SAPO-34 and SAPO-5 zeolite powders are easily produced at a relatively slow heating rate (1-3° C.·$min^{-1}$).

The present invention provides a method for preparing a Cu-based zeolite catalyst using the above hybrid crystal zeolite as a carrier, including: using a copper salt compound as a precursor of active species, mixing and stirring the AFI-CHA zeolite with the solution containing copper salt until the mixture is viscous, to make the copper evenly disperse into the pore of zeolite; subsequently, after drying the mixture in a water bath, performing a calcination in a muffle furnace at 300° C.-600° C. for 3-6 h to obtain Cu/AFI-CHA supported catalyst powders.

Further, the copper salt is one selected from the group consisting of $Cu(NO_3)_2$, $Cu(Ac)_2$ and $Cu(COOH)_2$.

Further, a standing time is 1-15 h, a temperature of the water bath for the drying is 50° C.-80° C., and a drying time is 1-7 h.

The present invention further provides a method to prepare the above-mentioned Cu/AFI-CHA supported catalyst into a monolithic catalyst, including preparing a slurry of the Cu/AFI-CHA supported catalyst powder and washcoating the slurry on a cordierite monolith substrate, with the amount of the catalyst powder on the cordierite monolith substrate is 120-130 g·$L^1$; drying the washcoated substrate at 70° C.-150° C., and then calcinating at 300° C.-600° C. for 3-6 h.

Further, the cordierite monolith substrate is purchased from Corning Corporation, USA, 400 mesh, 2.5 $cm^3$.

Compared with the prior art, the present invention has advantages as follows.

By synthesizing a novel AFI-CHA hybrid crystal zeolite, the $NH_3$-SCR activity of Cu-CHA catalyst is improved, and the more stable structure enables the better hydrothermal stability of Cu/AFI-CHA than Cu-CHA and Cu-AFI (see embodiments and comparative examples).

DETAILED DESCRIPTION OF THE EMBODIMENTS

Figure 1:
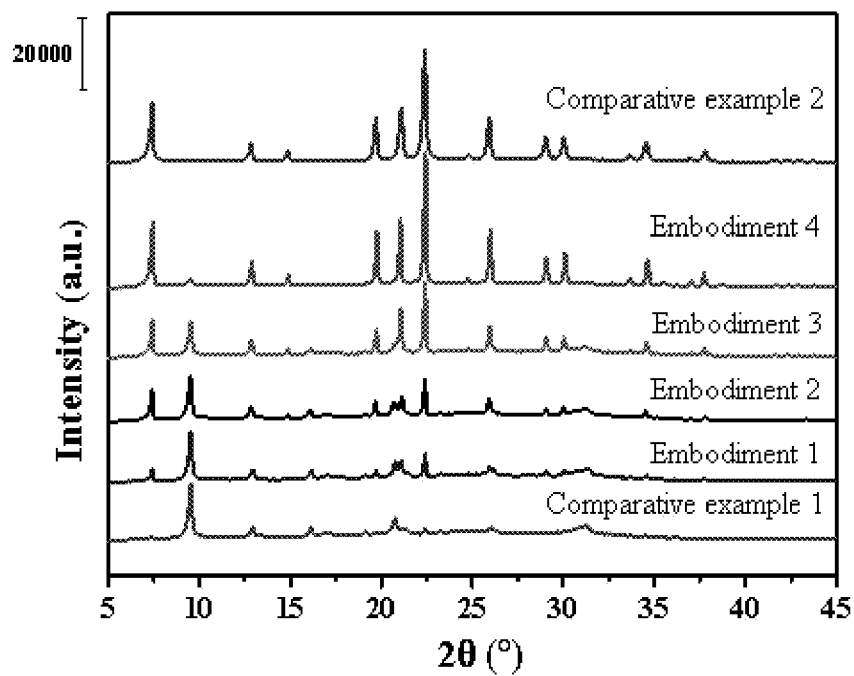
FIG. 1 is an x-ray diffraction (XRD) diagram of Cu/SAPO-34, Cu/SAPO-5 and Cu/AFI-CHA catalysts.
Figure 2A:
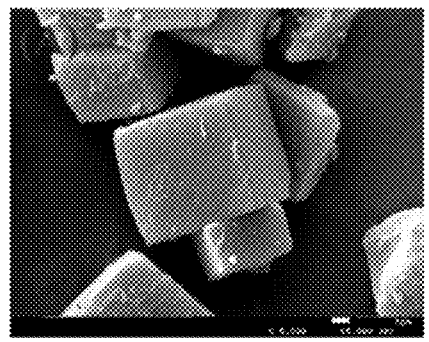
FIG. 2A is a scanning electron microscope (SEM) diagram of the Cu/SAPO-34 catalyst prepared by comparative example 1.
Figure 2B:
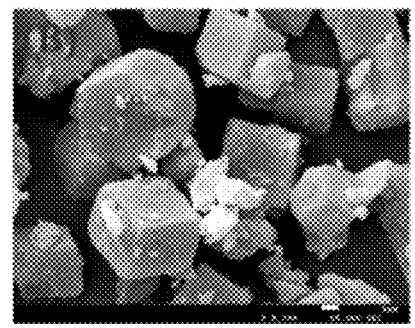
FIG. 2B is an SEM diagram of the Cu/AFI-CHA catalyst prepared by embodiment 1.
Figure 2C:
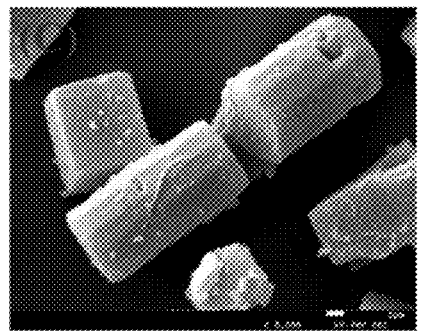
FIG. 2C is an SEM diagram of the Cu/AFI-CHA catalyst prepared by embodiment 2.
Figure 2D:
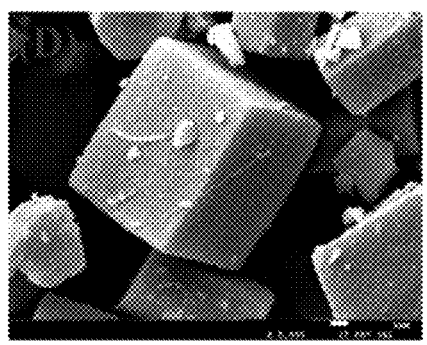
FIG. 2D is an SEM diagram of the Cu/AFI-CHA catalyst prepared by embodiment 3.
Figure 2E:
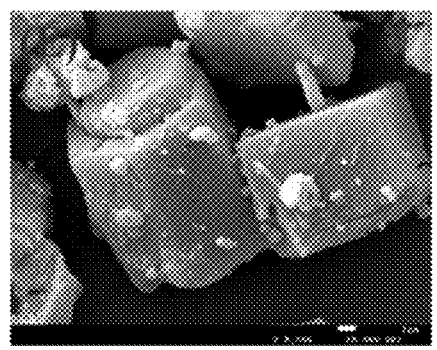
FIG. 2E is an SEM diagram of the Cu/SAPO-5 catalyst prepared by comparative example 2.

The present invention is further described hereinafter with reference to the specific embodiments. The method of the present invention is further described below through specific embodiments. The following embodiments are merely a part of the embodiments of the present invention rather than all. All other embodiments derived based on the embodiments of the present invention by those of ordinary skill in the art without creative efforts shall be considered as falling within the protective scope of the present invention.

Embodiment 1

15 g pseudoboehmite, 23 g phosphoric acid and 72 g water are mixed uniformly, stirred for 12 h, and aged at room temperature for 12 h to prepare a P/Al oxide gel. 6 g of 44 nm Si sol provided by Shanghai Nalco Company as a Si source, 20 g of structure directing agent TEA and 36 g of distilled water are added into the P/Al oxide gel, which is mixed evenly and stirred for 24 h, and then aged at room temperature for 12 h to obtain a mixed solution. The mixed solution is transferred to a hydrothermal kettle, followed by the hydrothermal reaction in an oven at a heating rate of 5° C.·mind to 160° C. and held for 10 h, and then heated to 200° C. and held for 20 h. After being cooled into the room temperature, centrifugation and washing are carried out for 4 times. Final, the structure directing agent is removed at 550° C. for 6 h to obtain SAPO-34 and SAPO-5 hybrid AFI-CHA zeolite powders. According to the main diffraction peak intensities of SAPO-5 and SAPO-34, the ratio of SAPO-5/SAPO-34 is 3.16.

Embodiment 2

15 g pseudoboehmite, 23 g phosphoric acid and 72 g water are mixed uniformly, stirred for 12 h, and aged at room temperature for 12 h to prepare a P/Al oxide gel. 6 g of 44 nm Si sol provided by Shanghai Nalco Company as a Si source, 35 g of structure directing agent TEA and 36 g of distilled water are added into the P/Al oxide gel, which is mixed evenly and stirred for 24 h, and then aged at room temperature for 12 h to obtain a mixed solution. The mixed solution is transferred to a hydrothermal kettle, followed by the hydrothermal reaction in an oven at a heating rate of 4° C.·min$^{-1}$ to 160° C. and held for 10 h, and then heated to 200° C. and held for 20 h. After being cooled into the room temperature, centrifugation and washing are carried out for 4 times. Final, the structure directing agent is removed at 550° C. for 6 h to obtain AFI-CHA zeolite powders.

Embodiment 3

15 g pseudoboehmite, 23 g phosphoric acid and 54 g water are mixed uniformly, stirred for 12 h, and aged at room temperature for 12 h to prepare a P/Al oxide gel. 6 g of 44 nm Si sol provided by Shanghai Nalco Company as a Si source, 20 g of structure directing agent TEA and 54 g of distilled water are added into the P/Al oxide gel, which is mixed evenly and stirred for 24 h, and then aged at room temperature for 12 h to obtain a mixed solution. The mixed solution is transferred to a hydrothermal kettle, followed by the hydrothermal reaction in an oven at a heating rate of 6° C. mind to 160° C. and held for 10 h, and then heated to 200° C. and held for 20 h. After being cooled into the room temperature, centrifugation and washing are carried out for 4 times. Final, the structure directing agent is removed at 550° C. for 6 h to obtain AFI-CHA zeolite powders.

Embodiment 4

15 g pseudoboehmite, 23 g phosphoric acid and 72 g water are mixed uniformly, stirred for 12 h, and aged at room temperature for 12 h to prepare a P/Al oxide gel. 6 g of 44 nm Si sol provided by Shanghai Nalco Company as a Si source, 12 g of structure directing agent TEA and 36 g of distilled water are added into the P/Al oxide gel, which is mixed evenly and stirred for 24 h, and then aged at the room temperature for 12 h to obtain a mixed solution. The mixed solution is transferred to a hydrothermal kettle, followed by the hydrothermal reaction in an oven at a heating rate of 3° C.·min$^{-1}$ to 160° C. and held for 10 h, and then heated to 200° C. and held for 20 h. After being cooled into the room temperature, centrifugation and washing are carried out for 4 times. Final, the structure directing agent is removed at 550° C. for 6 h to obtain AFI-CHA zeolite powders.

Comparative Example 1

15 g pseudoboehmite, 17 g phosphoric acid and 48 g water are mixed uniformly, stirred for 12 h, and aged at room temperature for 24 h to prepare a P/Al oxide gel. 8 g of 44 nm Si sol provided by Shanghai Nalco Company as a Si source, 35 g of structure directing agent TEAOH and 24 g of distilled water are added into the P/Al oxide gel, which is mixed evenly and stirred for 12 h, and then aged at the room temperature for 12 h to obtain a mixed solution. The mixed solution is transferred to a hydrothermal kettle, followed by the hydrothermal reaction in an oven at a heating rate of 3° C.·min to 160° C. and held for 20 h, and then heated to 200° C. and held for 30 h. After being cooled into room temperature, centrifugation and washing are carried out for 5 times. Final, the structure directing agent is removed at 600° C. for 5 h to obtain SAPO-34 zeolite powders.

Comparative Example 2

8 g pseudoboehmite, 13 g phosphoric acid and 12 g water are mixed uniformly, stirred for 12 h, and aged at room temperature for 12 h to prepare a P/Al oxide gel. 6 g of 44 nm Si sol provided by Shanghai Nalco Company as a Si source, 10 g of structure directing agent TEA and 8 g of distilled water are added into the P/Al oxide gel, which is mixed evenly and stirred for 1 h, and then aged at the room temperature for 24 h to obtain a mixed solution. The mixed solution is transferred to a hydrothermal kettle, followed by the hydrothermal reaction in an oven at a heating rate of 1° C.·min$^{-1}$ to 140° C. and held for 10 h, and then heated to 200° C. and held for 20 h. After being cooled into the room temperature, centrifugation and washing are carried out for 2 times. Final, the structure directing agent is removed at 500° C. for 8 h to obtain SAPO-5 zeolite powders.

These synthesized zeolites (embodiments 1-4 and comparative examples 1-2) are applied to prepare catalysts according to the following method.

The Cu-supported AFI/CHA hybrid crystal zeolite catalyst is prepared with a copper salt compound (such as $Cu(NO_3)_2$, $Cu(Ac)_2$ and $Cu(COOH)_2$) as a precursor. The copper salt compound is dissolved in deionized water to form a solution with a certain concentration of metal salt. 10 g of the prepared SAPO-34, SAPO-5 and AFI-CHA hybrid crystal zeolites are poured into the copper salt solution and stirred for 30 min to obtain a mixture. The stirring is continued until the mixture becomes viscous to ensure that the copper species are uniformly dispersed into the pore of zeolite. The mixture is left to stand for 10 h and then is dried to a water bath at 80° C. for 6 h, and then calcined in a muffle furnace at 500° C. for 4 h to obtain Cu/CHA, Cu/AFI and Cu/AFI-CHA supported catalyst powders, respectively.

The Cu/SAPO-34, Cu/SAPO-5 and Cu/AFI-CHA zeolite-based catalysts were respectively washcoated on a monolithic cordierite (Corning Corporation, USA, 400 mesh, 2.5 cm$^3$) by the following technology. The specific method is as follows.

a) The obtained Cu/SAPO-34, Cu/SAPO-5 and Cu/AFI-CHA zeolite-based catalyst powders are mixed uniformly with zirconium acetate and acetic acid respectively to form a coating slurry; a solid content of the slurry is controlled to 45%, a content of the zirconium acetate in the slurry is 3%, and a content of the acetic acid is 3%.

b) The slurry is washcoated on a cordierite honeycomb ceramic substrate, and the loading amount of the catalyst is 180 g·L$^{-1}$; and c) the coated substrate is dried to 100° C., and then calcined at 500° C. for 4 h to obtain monolithic Cu/SAPO-34, Cu/SAPO-5 and Cu/AFI-CHA catalysts, respectively.

When the copper is supported and the monolithic catalyst is prepared as described above, the loading amount of copper is the same as the loading amount of the catalyst on the monolithic catalyst.

The structures of the zeolites prepared in embodiments 1-4 and comparative examples 1-2 are analyzed by XRD, and the results are shown in FIG. 1. It can be found that SAPO-34 with a CHA structure, SAPO-5 with an AFI structure, and AFI-CHA hybrid crystal zeolites with different proportions have been synthesized.

The morphology of pure crystals and hybrid crystal SAPO-n are characterized by SEM, shown in FIGS. 2A-E. SAPO-34 are cubic crystals, which is consistent with the typical SAPO-34 morphology reported in the literature. AFI-CHA hybrid crystals have not only cubic crystals, but also hexagonal prism-shaped grains, which is the typical morphology of SAPO-5.

Catalytic Performance Test

The NH$_3$-SCR performance is tested in a self-assembled multi-channel fixed continuous flow micro-reactor in the laboratory. The simulated diesel vehicle exhaust composition and experimental conditions are shown in Table 1. Before the test, the monolithic catalyst is pretreated in the reaction gas (simulated diesel vehicle exhaust) at 550° C. Then, the unconverted NO, NO$_2$ and N$_2$O are recorded with a Fourier transform infrared (FTIR) gas analyzer (Thermo Fisher Scientific), and then the activity is calculated at the test temperature.

TABLE 1

| Simulated exhaust conditions | | | | | | |
|---|---|---|---|---|---|---|
| Simulate diesel vehicle exhaust components | NO | NH$_3$ | O$_2$ | H$_2$O | N$_2$ | Air-speed (h$^{-1}$) |
| Simulated diesel vehicle exhaust content | 200 ppm | 200 ppm | 10 vol. % | 5 vol. % | Balance gas | 40,000 |

Figure 5:
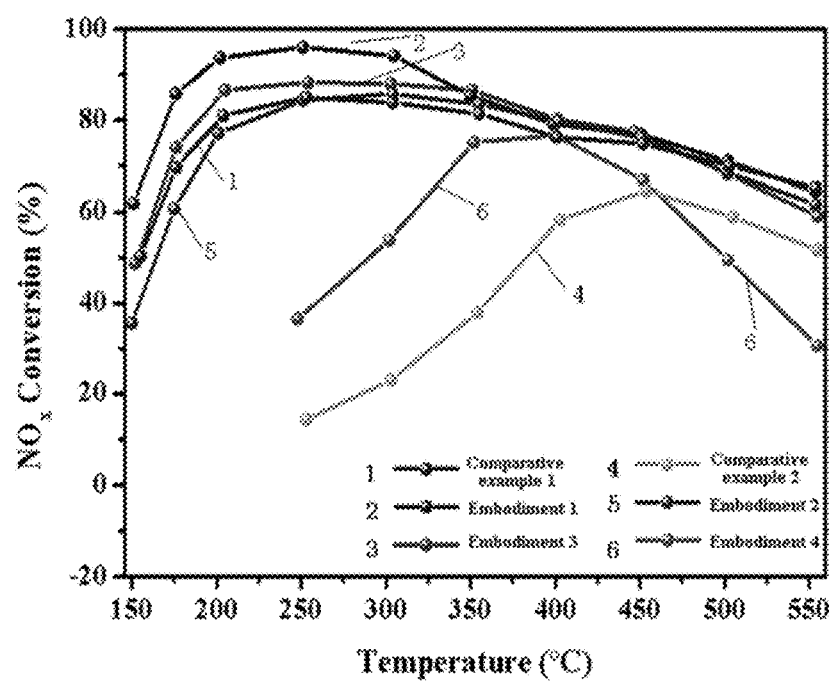
FIG. 5 is a diagram showing $NH_3$-SCR activities of Cu/SAPO-34, Cu/SAPO-5 and Cu/AFI-CHA catalysts.

The NH$_3$-SCR activity of Cu/CHA, Cu/AFI and Cu/AFI-CHA zeolite catalysts are shown in FIG. 5. The comparative example 2 with an AFI structure exhibits the poor NH$_3$-SCR activity, with the highest conversion reaching 65% only at 450° C.; the activities of embodiment 2 and embodiment 3 are not significantly different from that of comparative example 1 with a CHA structure; while the activity of fresh Cu/AFI-CHA (embodiment 1) is significantly higher than that of comparative example 1; and the difference in maximum NO$_x$ conversion between embodiment 1 and comparative example 1 is about 13% at 300° C.-150° C.

Embodiment 5

In order to investigate the influence of the AFI-CHA hybrid crystal structure on the hydrothermal stability of the monolithic Cu/AFI-CHA catalyst, Cu/AFI-CHA catalyst is prepared using 10 g of AFI-CHA zeolite according to the same method mentioned above (incipient-wetness impregnation method) as the fresh catalyst.

Embodiment 6

In order to investigate the influence of the AFI-CHA hybrid crystal structure on the hydrothermal stability of the monolithic Cu/AFI-CHA catalyst, the monolithic Cu/AFI-CHA catalyst prepared in embodiment 5 is hydrothermally aged at 800° C. for 12 h in the flowing air containing 10 vol. % H$_2$O, and then its performance is evaluated. The composition of the reaction gas and the test method are the same as those in the performance test of catalyst.

Comparative Example 3

In order to investigate the influence of the SAPO-34 structure with the CHA structure on the hydrothermal stability of the monolithic Cu/CHA catalyst, Cu/CHA catalyst is prepared using 10 g of SAPO-34 zeolite with the CHA structure as a comparative example 3 according to the same incipient-wetness impregnation method above. Then, the obtained Cu/CHA powder was washcoated on the cordierite honeycomb ceramic substrate to obtain the monolithic Cu/CHA NH$_3$-SCR catalyst for diesel vehicles.

Comparative Example 4

In order to investigate the hydrothermal stability of the monolithic Cu/CHA catalyst, the monolithic Cu/CHA catalyst is hydrothermally aged at 800° C. for different times (24-72 h) in the flowing air containing 10 vol. % H$_2$O. The composition of the reaction gas and the test method are the same as those in Table 1.

Figure 3:
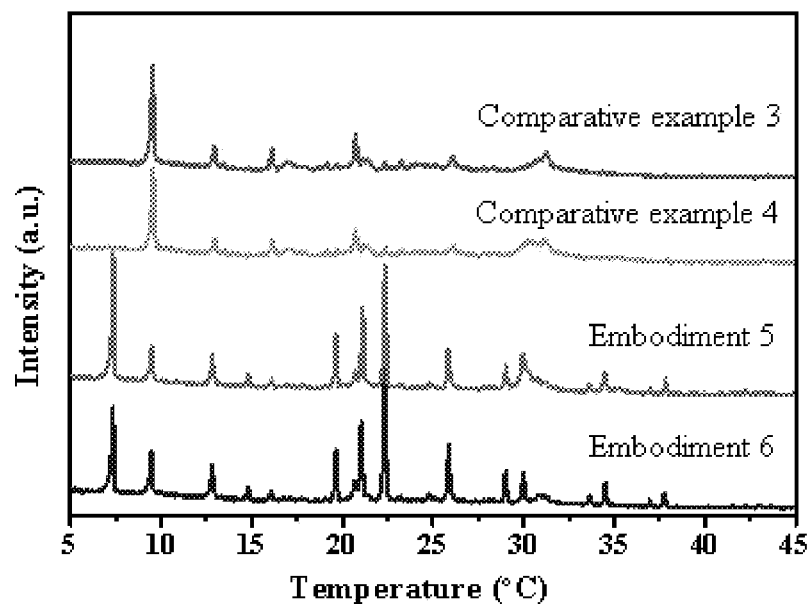
FIG. 3 is an XRD diagram of Cu/SAPO-34 and Cu/AFI-CHA catalysts after high-temperature hydrothermal aging.
Figure 4A:
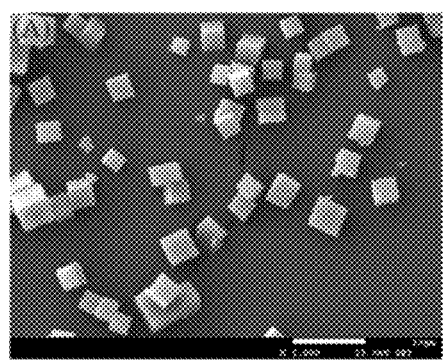
FIG. 4A is an SEM diagram showing the fresh Cu/SAPO-34 catalyst of comparative example 3.
Figure 4B:
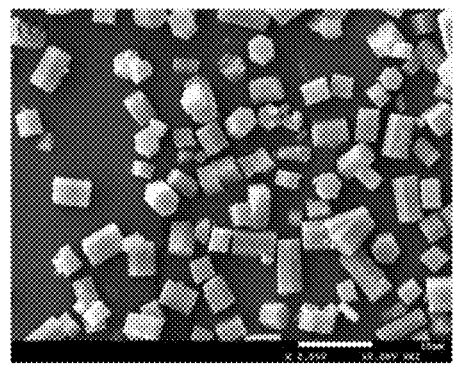
FIG. 4B is an SEM diagram showing the fresh Cu/AFI-CHA catalyst of embodiment 5.
Figure 4C:
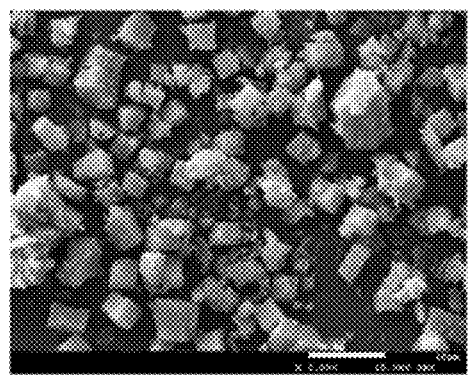
FIG. 4C is an SEM diagram showing the Cu/SAPO-34 catalyst after high-temperature hydrothermal aging of comparative example 4.
Figure 4D:
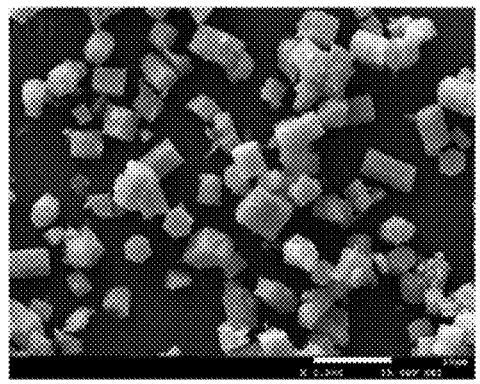
FIG. 4D is an SEM diagram showing the Cu/AFI-CHA catalyst after high-temperature hydrothermal aging of embodiment 6.

The XRD diagram of FIG. 3 shows that the embodiment 3 is consistent with the diffraction peak of typical SAPO-34 structure reported in the literature. However, in addition to the XRD diffraction peak of SAPO-34, the characteristic diffraction peak of SAPO-5 also appears in the AFI-CHA hybrid crystal zeolite of embodiment 5. After high-temperature hydrothermal aging, the diffraction peak intensities of SAPO-34 of both samples are decreased, but the diffraction peak intensity of SAPO-34 of pure crystals of comparative example 4 decreases more obviously than that of the hybrid crystals of embodiment 6. In addition, the characteristic diffraction peaks of SAPO-5 in the hybrid crystal samples increased in intensity after high-temperature hydrothermal aging. Thus, AFI-CHA hybrid crystals are maintained better after the high-temperature hydrothermal aging.

FIGS. 4A-D shows that the sizes of SAPO-34 crystals over both fresh samples are 2-5 μm. After high-temperature hydrothermal aging, most of the cubic structure of Cu/SAPO-34 are obviously destroyed, and some amorphous appear. In contrast, Cu/AFI-CHA remains better structural integrity than Cu/SAPO-34 after hydrothermal aging. These results show that Cu/AFI-CHA hybrid crystals are more stable after the high-temperature hydrothermal aging, which is conducive to the better high-temperature hydrothermal stability.

Figure 6:
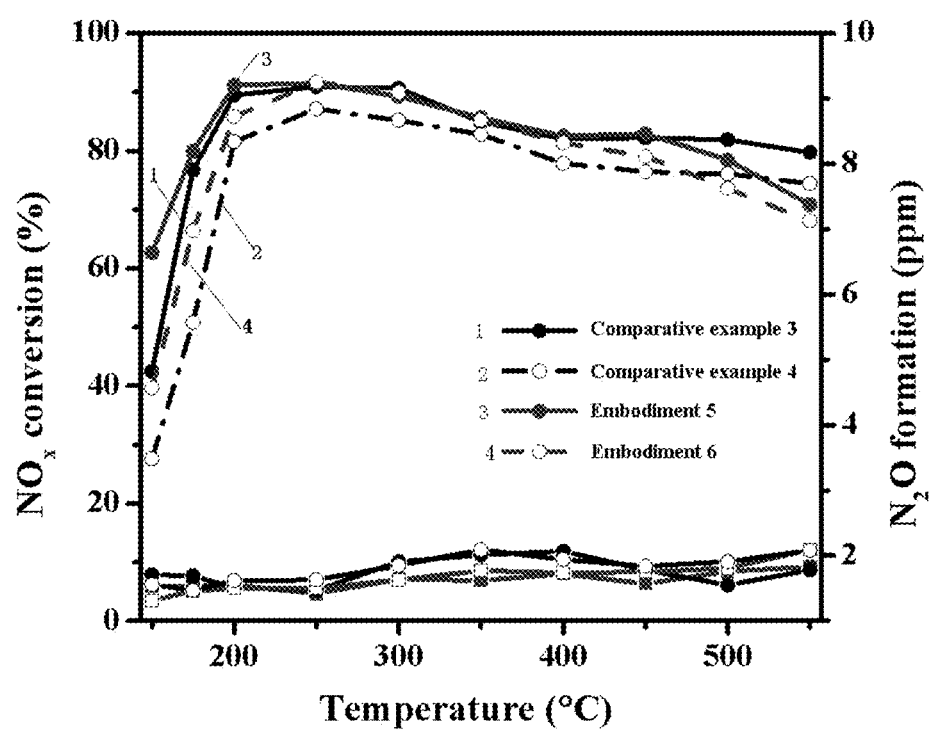
FIG. 6 is an SEM diagram showing Cu/SAPO-34 and Cu/AFI-CHA catalysts before and after high-temperature hydrothermal aging.

FIG. 6 shows the $NH_3$-SCR activity of comparative example 3 and embodiment 5 before and high-temperature hydrothermal aging. It can be found that the $NO_x$ conversion of both fresh catalysts are similar in the temperature range of 200° C.-450° C., with the highest conversion about 90%. At the low temperature (150° C.-200° C.), the activity of embodiment 5 is better than that of comparative example 3, which may be due to that the larger proportion of mesopores in AFI-CHA is beneficial to the diffusion of reaction gas at the low temperature. At the high temperature (450° C.-550° C.), the comparative example 3 exhibits the better activity. After the high-temperature hydrothermal aging, the activity of embodiment 6 is maintained better than that of comparative example 4, the maximum $NO_x$ conversion of the aged catalyst in embodiment 6 is almost unchanged, while the highest $NO_x$ conversion of comparative example 4 decreases by 8%, indicating that the catalyst prepared by the method as the present invention has the better low-temperature activity and hydrothermal stability.

In addition, the amount of by-product $N_2O$ of catalysts before and after hydrothermal aging are less than 3 ppm, indicating the high $N_2$ selectivity before and after hydrothermal aging.

What is claimed is:

1. A Cu/AFI-CHA supported zeolite catalyst based on an AFI-CHA hybrid crystal zeolite, wherein Cu is supported on the AFI-CHA hybrid crystal zeolite; the AFI-CHA hybrid crystal zeolite comprises an AFI-type SAPO-5 zeolite and a CHA-type SAPO-34 zeolite, grains of the AFI-CHA hybrid crystal zeolite are hybrid crystal grains of AFI and CHA; and the AFI-CHA hybrid crystal zeolite is prepared by the following method:
   (1) performing a feeding according to a molar ratio of aluminum:phosphorus:silicon:a structure directing agent:water in the AFI-CHA hybrid crystal zeolite of (0.06-0.10):(0.06-0.10):(0.040-0.050):(0.12-0.35):(0.5-6), mixing pseudoboehmite, phosphoric acid, and water uniformly to obtain a first mixture, stirring and aging the first mixture at the room temperature to prepare a P/Al oxide gel, and then adding a Si source, the structure directing agent and water into the P/Al oxide gel to obtain a second mixture, aging the second mixture at room temperature to obtain a first mixed solution; and
   (2) then keeping the first mixed solution at 120° C.-160° C. for 2-20 h, then heating to 190° C.-210° C. and holding for 5-30 h, cooling to the room temperature and separating a solid from the first mixed solution, then calcinating the solid at 500° C.-600° C. for 5-8 h to remove the structure directing agent to obtain an AFI-CHA hybrid crystal zeolite powder; wherein a heating rate of step (2) is 3-6° C.·$min^{-1}$;
   in step (1) and step (2), zeolites with different AFI/CHA hybrid crystal proportions are obtained by selecting different values for at least one of the molar ratio of the structure directing agent, a keeping temperature of the first mixed solution, a calcinating temperature of the solid, and the heating rate.

2. The Cu/AFI-CHA supported zeolite catalyst according to claim 1, wherein the pseudoboehmite is 8-15 parts by weight, the phosphoric acid is 13-23 parts by weight, the Si source is 5-8 parts by weight, and the structure directing agent is 1-41 parts by weight.

3. The Cu/AFI-CHA supported zeolite catalyst according to claim 1, wherein the structure directing agent is triethylamine or tetraethyl ammonium hydroxide.

4. A monolithic catalyst, comprising a substrate and a powder of the Cu/AFI-CHA supported zeolite catalyst according to claim 1, wherein the powder of the Cu/AFI-CHA supported zeolite catalyst is washcoated on a cordierite monolith substrate.

5. A method for preparing the Cu/AFI-CHA supported zeolite catalyst according to claim 1, comprising using a copper salt compound as a precursor to prepare a copper salt solution, mixing and stirring the AFI-CHA hybrid crystal zeolite with the copper salt solution to obtain a third mixture until the third mixture is viscous, to make the Cu evenly disperse into the AFI-CHA hybrid crystal zeolite; after drying the third mixture in a water bath, performing a calcination on the third mixture in a muffle furnace at 300° C.-600° C. for 3-6 h to obtain a powder of the Cu/AFI-CHA supported zeolite catalyst.

6. A method for preparing the monolithic catalyst according to claim 4, comprising preparing the powder of the Cu/AFI-CHA supported zeolite catalyst into a slurry and washcoating the slurry on the cordierite monolith substrate to obtain a washcoated substrate, wherein an amount of the Cu/AFI-CHA supported zeolite catalyst has a loading amount on the cordierite monolith substrate is 120-130 g·$L^{-1}$; drying the coated substrate at 70° C.-150° C., and then calcinating the coated substrate at 300° C.-600° C. for 3-6 h.

7. The Cu/AFI-CHA supported zeolite catalyst according to claim 2, wherein the structure directing agent is triethylamine or tetraethyl ammonium hydroxide.

* * * * *